(12) United States Patent
Hung et al.

(10) Patent No.: US 9,194,370 B2
(45) Date of Patent: Nov. 24, 2015

(54) WIND-POWER GENERATOR CONTROL SYSTEM, AND METHOD

(71) Applicant: DELTA ELECTRONICS, INC., Taoyuan Hsien (TW)

(72) Inventors: Yun-Chi Hung, Taoyuan Hsien (TW); Chih-Hung Hsiao, Taoyuan Hsien (TW); Cheng-Chieh Chan, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/087,325

(22) Filed: Nov. 22, 2013

(65) Prior Publication Data

US 2014/0312621 A1    Oct. 23, 2014

(30) Foreign Application Priority Data

Apr. 17, 2013    (CN) .......................... 2013 1 0134323

(51) Int. Cl.
*F03D 9/00*     (2006.01)
*F03D 7/02*     (2006.01)

(52) U.S. Cl.
CPC ............ *F03D 7/0272* (2013.01); *F03D 7/0284* (2013.01); *Y02E 10/723* (2013.01)

(58) Field of Classification Search
CPC ...... F03D 7/0272; F03D 7/084; F03D 7/0288
USPC ................................ 290/44, 55; 700/286, 287
See application file for complete search history.

(56) References Cited

U.S. PATENT DOCUMENTS

| 2,152,576 | A | * | 3/1939 | Weeks | ........................... 290/44 |
|---|---|---|---|---|---|
| 4,409,640 | A | * | 10/1983 | Profio et al. | ................... 361/197 |
| 4,511,807 | A | * | 4/1985 | Somerville | ..................... 290/44 |
| 5,397,926 | A | * | 3/1995 | Matsui et al. | ................... 307/32 |
| 5,400,203 | A | * | 3/1995 | Tice | ................................ 361/62 |
| 5,630,145 | A | * | 5/1997 | Chen | ............................. 713/322 |
| 6,128,176 | A | * | 10/2000 | Radichio | ....................... 361/160 |
| 8,035,940 | B2 | * | 10/2011 | Lee | ................................ 361/91.1 |
| 2003/0107859 | A1 | * | 6/2003 | Pan et al. | ......................... 361/58 |
| 2007/0164567 | A1 | * | 7/2007 | Luetze et al. | .................... 290/44 |
| 2013/0099567 | A1 | * | 4/2013 | Pfitzer | ............................ 307/29 |

* cited by examiner

*Primary Examiner* — Julio Gonzalez Ramirez
(74) *Attorney, Agent, or Firm* — Muncy, Geissler, Olds & Lowe, P.C.

(57) ABSTRACT

A wind-power generator control system is provided. The wind-power generator control system includes a wind turbine, a power generator, a normally closed relay, and a control unit. The wind-power generator has a first output terminal and a second output terminal, and outputs a power output via the first and second output terminal when the wind turbine rotates. The normally closed relay is connected between the first and second output terminals. The control unit transmits a control signal to the normally closed relay by grid power. Also, when the normally closed relay does not receive the control signal, the first output terminal short-circuits the second output terminal by the normally closed relay for protecting the wind-power generator. When the normally closed relay receives the control signal, the first output terminal open-circuits the second output terminal by the normally closed relay for providing the power output.

14 Claims, 3 Drawing Sheets

WIND-POWER GENERATOR CONTROL SYSTEM, AND METHOD

CROSS REFERENCE TO RELATED APPLICATIONS

This application claims priority of China Patent Application No. 201310134323.5, filed on Apr. 17, 2013, the entirety of which is incorporated by reference herein.

TECHNICAL FIELD

The invention relates to wind-power generator control systems, and more particularly to a wind-power generator control system that is capable of long-term process protection of the generator.

BACKGROUND

Nowadays, the control safety protection technology of a wind-power system must be provided with external power (such as a battery or capacitor) for keeping the generator short-circuited. However, when the generator is being maintained in the protection mode for a long time, the power of the battery or capacitor may be consumed, and it is hard to maintain the short-circuit state of the generator. Therefore, it increases the risk that the generator cannot be controlled properly.

Also, for the operations of a conventional generator, when an excessive current or power is generated, the generator short-circuits to prevent damage to the generator system. However, a large resistance is generated when the generator short-circuits, and it may cause damage to the generator system. Therefore, an improved wind-power generator control system is needed.

SUMMARY

The invention provides a wind-power generator control system, comprising: a wind turbine; a power generator having a first output terminal and a second output terminal, and outputting a power output via the first output terminal and the second output terminal when the wind turbine rotates; a normally closed relay, connected between the first output terminal and the second output terminal; and a control unit, transmitting a control signal to the normally closed relay by grid power, wherein when the normally closed relay does not receive the control signal, the first output terminal short-circuits the second output terminal by the normally closed relay; and when the normally closed relay receives the control signal, the first output terminal open-circuits the second output terminal by the normally closed relay.

In an embodiment, the wind-power generator control system further comprises a current-detection unit, detecting the current value of the first output terminal, and transmitting the current value to the control unit, wherein the control unit determines whether to provide the control signal to the normally closed relay according to the current value.

In an embodiment, when the current value is less than a predetermined current value or greater than a rating current value, the control unit stops providing the control signal to the normally closed relay, and wherein when the current value is greater than the predetermined current, the control unit provides the control signal to the normally closed relay.

In the other embodiments, the control unit estimates a power estimate of the power output generated by the power generator according to the current value, wherein when the power estimate of the power output is less than the total power consumption of the wind-power generator control system, the control unit stops providing the control signal to the normally closed relay, and wherein when the power estimate of the power output is greater than the total power consumption of the wind-power generator control system, the control unit provides the control signal to the normally closed relay.

In an embodiment, the wind-power generator control system comprises a switch coupled between the power generator and the grid power, wherein when the power estimate of the power output is greater than the total power consumption, the control unit turns on the switch; and when the power estimate of the power output is less than the total power consumption, the control unit turns off the switch.

In an embodiment, the wind-power generator control system comprises a resistor unit; and a wind turbine rotation speed detection unit, configured to detect the rotation speed of the wind turbine, wherein when the rotation speed is greater than a threshold rotation speed, the control unit outputs a part of the power output to the resistor unit.

In an embodiment, after the control outputs the part of the power output to the resistor unit, the control unit stops providing the control signal to the normally closed relay.

In an embodiment, the power generator further comprises a rectification unit generating DC voltage according to the power output. The control unit further comprises an inverter configured to convert the DC voltage to AC voltage, and provide the AC voltage to the grid power.

In an embodiment, when the control unit does not receive the grid power, the control unit stops generating the control signal.

The invention provides a wind-power generator control method for a wind-power generator control system comprising a wind turbine, a power generator, and a normally closed relay, wherein the power generator has a first output terminal and a second output terminal, the normally closed relay is connected between the first output terminal and the second output terminal, and the wind-power generator control method comprising: outputting a power output via the first output terminal and the second output terminal when the wind turbine rotates; transmitting a control signal to the normally closed relay using grid power; when the normally closed relay does not receive the control signal, short-circuiting the first output terminal and the second output terminal by the normally closed relay; and when the normally closed relay receives the control signal, open-circuiting the first output terminal and the second output terminal by the normally closed relay.

In an embodiment, the wind-power generator control method further comprises: detecting the current value of the first output terminal; and determining whether to provide the control signal to the normally closed relay according to the current value.

In an embodiment, the wind-power generator control method further comprises: when the current value is less than a predetermined current value or greater than a rating current value, stopping the control signal to the normally closed relay; and when the current value is greater than the predetermined current, providing the control signal to the normally closed relay.

In an embodiment, the wind-power generator control method further comprises: estimating a power estimate of the power output generated by the power generator according to the current value; when the power estimate of the power output is less than the total power consumption of the wind-power generator control system, stopping the control signal to the normally closed relay; and when the power estimate of the power output is greater than the total power consumption of the wind-power generator control system, providing the control signal to the normally closed relay.

In an embodiment, the wind-power generator control system further comprises a switch coupled between the power generator and the grid power, and wind-power generator control method further comprises: when the power estimate of the power output is greater than the total power consumption, turning on the switch; and when the power estimate of the power output is less than the total power consumption, turning off the switch.

In an embodiment, the wind-power generator control method further comprises: detecting the rotation speed of the wind turbine; and when the rotation speed is greater than a threshold rotation speed, outputting a part of the power output to a resistor unit.

In an embodiment, the wind-power generator control method further comprises: after the control outputs the part of the power output to the resistor unit, stopping the control signal to the normally closed relay.

In an embodiment, the wind-power generator control method further comprises: generating DC voltage according to the power output by a rectification unit. The wind-power generator control method further comprises: converting the DC voltage to AC voltage by an inverter; and providing the AC voltage to the grid power.

In an embodiment, the wind-power generator control method further comprises: when the wind-power generator control system does not receive the grid power, stopping the control signal.

BRIEF DESCRIPTION OF DRAWINGS

The invention will become more fully understood by referring to the following detailed description with reference to the accompanying drawings, wherein.

DESCRIPTION OF EMBODIMENTS

The making and use of the embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the disclosure, and do not limit the scope of the disclosure.

Figure 1:
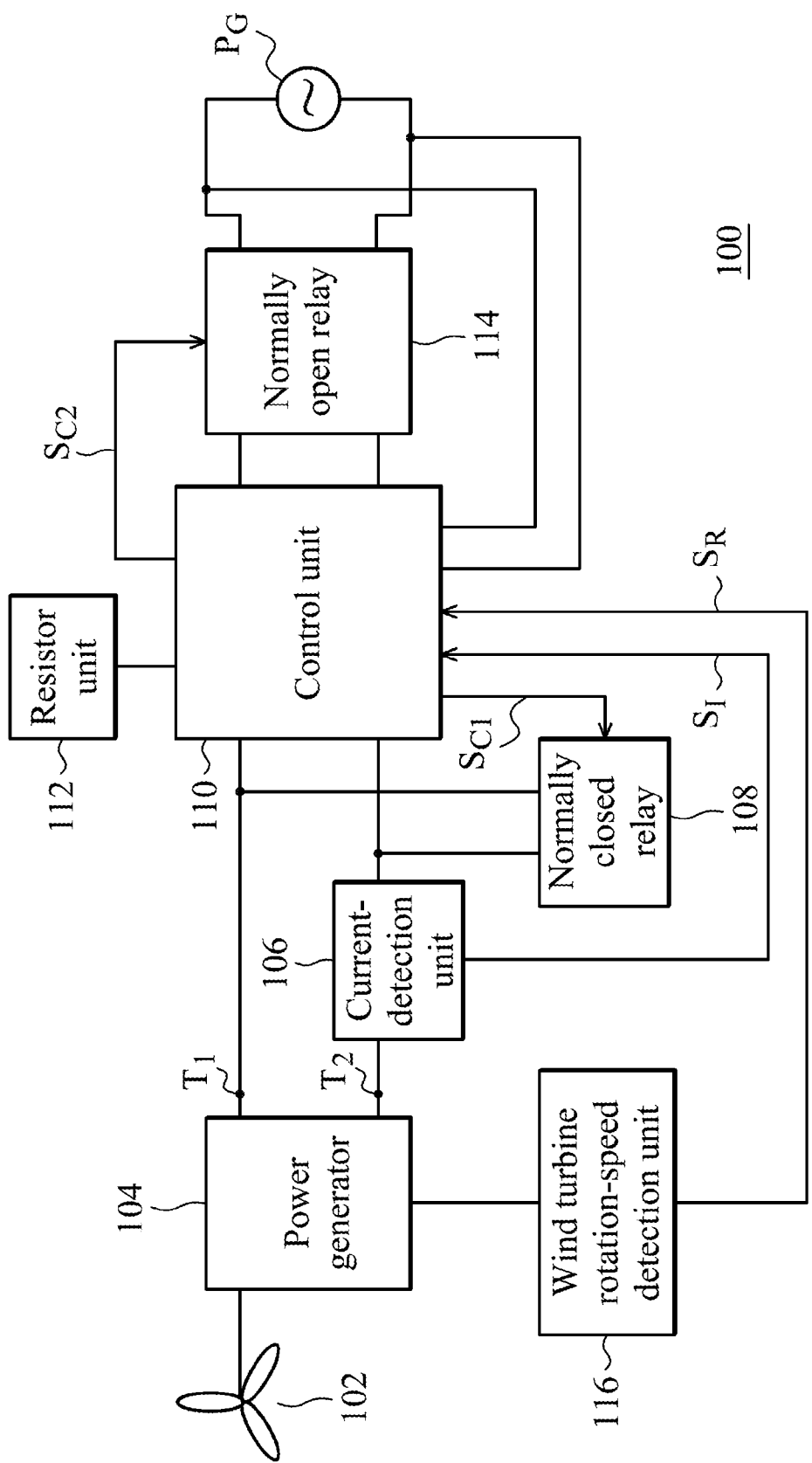
FIG. 1 is a block diagram illustrating an embodiment of a wind-power generator control system according to the invention.

FIG. 1 is a block diagram illustrating an embodiment of a wind-power generator control system according to the invention. The wind-power generator control system 100 includes a wind turbine 102, a power generator 104, a current-detection unit 106, a normally closed relay 108, a control unit 110, a resistor unit 112, a normally open relay 114, and a wind turbine rotation-speed detection unit 116. Grid power $P_G$ is configured to provide power to the normally closed relay 108 and the control unit 110, and the operation is described in detail below.

In the embodiment of FIG. 1, the wind turbine 102 is connected to the power generator 104. The power generator 104 has an output terminal $T_1$ and an output terminal $T_2$. Generally speaking, the output terminal $T_1$ and the output terminal $T_2$ correspond respectively to positive voltage output and negative voltage output. When the wind turbine 102 rotates, the generator winding (not shown) in the power generator 104 generates power, and outputs the power via the output terminal $T_1$ and the output terminal $T_2$. In some embodiments, the power generator 104 comprises a rectification unit for transforming voltage, and the power output can match with the design, such as transforming a DC voltage into AC voltage.

The current-detection unit 106 is connected to the output terminal $T_2$ and it measures the current value $S_I$ generated by the power generator 104, and further transmits the current value $S_I$ to the control unit 110. It should be noted that, although the current-detection unit 106 is connected to the output terminal $T_2$ in the embodiment of FIG. 1, the invention is not limited thereto. One skilled in the art can make the current-detection unit 106 connect to the output terminal $T_1$ or another possible position for detecting the current value $S_I$ generated by the power generator 104.

The normally closed relay 108 is connected between the output terminal $T_1$ and the output terminal $T_2$, and the control unit 110 uses the grid $P_G$ to provide a control signal $S_{C1}$ to the normally closed relay 108 for controlling the normally closed relay 108. For example, when the normally closed relay 108 does not receive the control signal $S_{C1}$, the normally closed relay 108 short-circuits. Namely, the output terminal $T_1$ has been electrically connected to the output terminal $T_2$. On the other hand, when the normally closed relay 108 receives the control signal $S_{C1}$, the normally closed relay 108 open-circuits. Namely the output terminal $T_1$ is electrically connected to the output terminal $T_2$. When the normally closed relay 108 has not received the control signal $S_{C1}$, the normally closed relay 108 keeps the output terminal $T_1$ and the output terminal $T_2$ electrically connected to each other. Therefore, the current generated by the power generator 104 is fed back, and it resists the rotation of the wind turbine 102. Also, the power generator 104 can operate at a low rotation speed for a long time, and standby power for protection of the power generator is not needed. Further, because the control signal $S_{C1}$ is generated by the grid power $P_G$, when the grid power $P_G$ is shut-down, the normally closed relay 108 can automatically become short-circuited for electrically connecting the output terminal $T_1$ to the output terminal $T_2$, such that the operation of the generator 104 is protected.

The control unit 110 controls the normally closed relay 108 according to the current value $S_I$ provided by the current-detection unit 106, and controls the normally open relay 114 according to the rotation speed value $S_R$ provided by the wind turbine rotation-speed detection unit 116. Also, the power output of the power generator 104 may provide the grid power $P_G$ via the control unit 110. In some embodiments, the control unit 110 may comprise a step-up transformer or a step-down transformer for transforming the voltage to a higher voltage or a lower voltage. The control unit may further comprise an inverter (not shown). When the rectification unit of the power generator 104 outputs DC power, the inverter can transform the DC power to AC power or adjust the voltage level of the power, and further provide the adjusted power to the grid power $P_G$.

The resistor unit 112 is connected to the control unit 110. When the control unit 110 determines that the power generated by the power generator 104 is too high, the control unit 110 provides a part of the power generated by the power generator 104 to the resistor unit 112. The related operation is described below.

The normally open relay 114 is connected between the control unit 110 and grid power $P_G$, and the control unit 110 provides a control signal $S_{C2}$ to the normally open relay 114 for controlling the normally open relay 114. For example, when the normally open relay 114 does not receive the control signal $S_{C2}$, the normally open relay 114 is open-circuited, and the power output of the power generator 104 is not provided to the grid power $P_G$. When the normally open relay 114 receives the control signal $S_{C2}$, the normally open relay 114 is short-circuited, and the power output of the power generator 104 is provided to the grid power $P_G$ via the control unit 110. It should be noted that, although the normally open relay 114 is connected between the control unit 110 and grid power $P_G$ in the embodiment of FIG. 1, the invention is not limited thereto. One skilled in the art may use the other switch unit in place of the normally open relay 114 according to the invention.

The wind turbine rotation-speed detection unit 116 is configured to measure the rotation speed value $S_R$ of the wind turbine 102 and transmit the rotation speed value $S_R$ to the control unit 110. In some embodiments, the wind turbine rotation-speed detection unit 116 can be installed in the power generator 104, and it measures the rotation speed value $S_R$ of the wind turbine 102 according to the power, current or voltage generated by the power generator 104.

Figure 2:
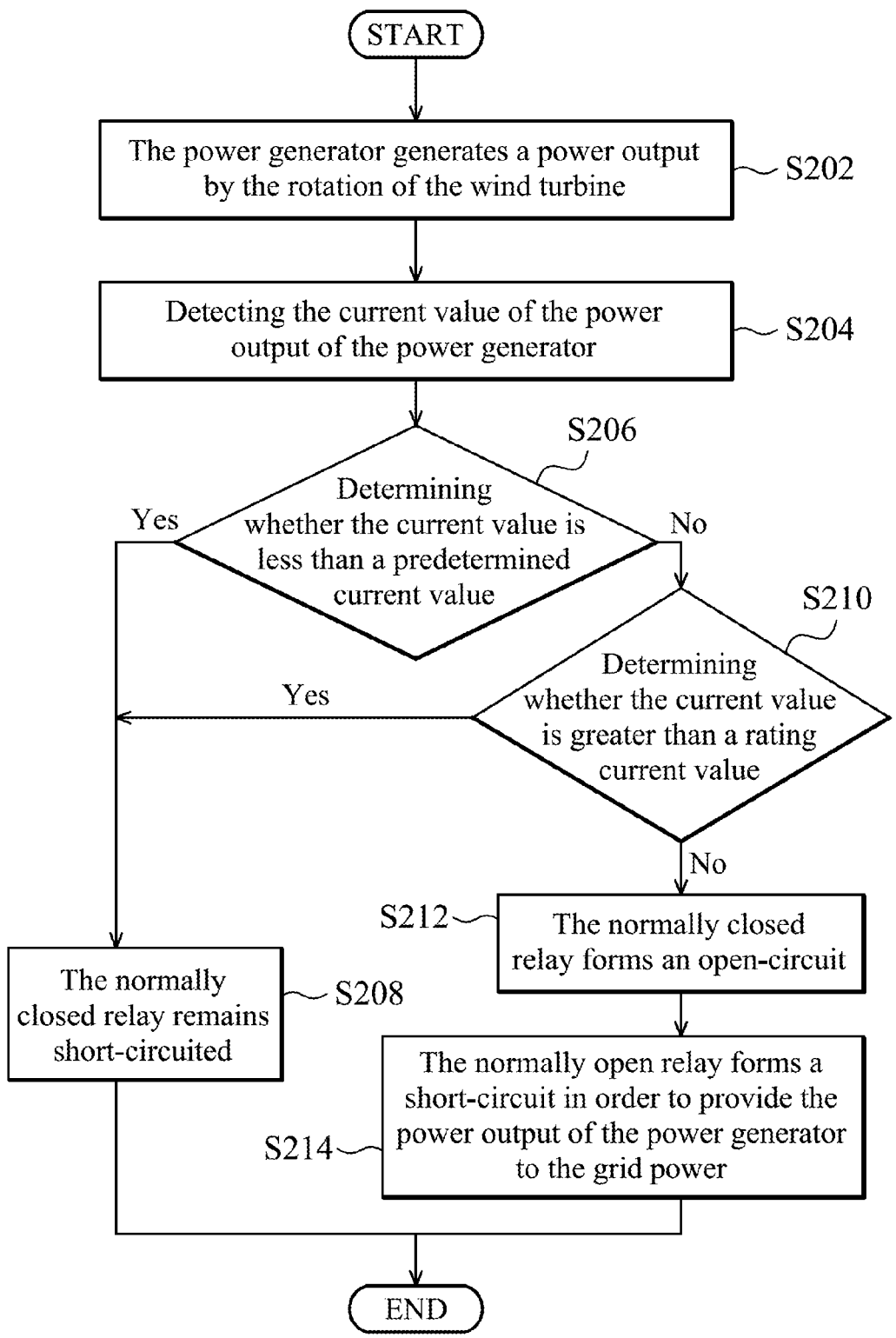
FIG. 2 is a flowchart of an embodiment of a method for the wind-power generator control system shown in FIG. 1.

The operations of the invention are described in FIG. 2 and in the following paragraphs. FIG. 2 is a flowchart of an embodiment of a method for the wind-power generator control system shown in FIG. 1. In step S202, the wind turbine 102 rotates, and the power generator 104 generates a power output. Next, in step S204, the current-detection unit 106 detects the current of the power output of the power generator 104 and transmits the current value $S_I$ to the control unit 110.

Due to the control signal $S_{C1}$ not being provided to the normally closed relay 108 in the initial state, the power output terminal $T_1$ is electrically connected to the power output terminal $T_2$, such that the power generator 104 operates at a low rotation speed while in a protection mode. In order to determine whether the power output of the power generator 104 is enough to provide a positive power output, the control unit 110 determines whether the current value $S_I$ is less than a predetermined current value in step S206. If the current value $S_I$ is less than the predetermined current value, step S208 will be performed next. On the other hand, if the current value $S_I$ is greater than the predetermined current value, step S210 will be performed next.

In step S208, the control unit 110 does not provide the control signal $S_{C1}$ to the normally closed relay 108, and the normally closed relay 108 remains short-circuited. On the other hand, in step S210, the control unit 110 further determines whether the current value $S_I$ is greater than a rating current value. If the current value $S_I$ is greater than the rating current value, step S208 will be performed next. If the current value $S_I$ is less than the rating current value, step S212 will be performed next. It should be noted that the rating current is the maximum current of the power generate 104 with controllable torque of the wind turbine. If the current value $S_I$ exceeds the rating current value, namely the torque of the wind turbine is greater than the torque of the power generator, the power generator 104 cannot stop the rotation of the wind turbine. In step S212, the control unit 110 provides a control signal $S_{C1}$ to the normally closed relay 108 by using the grid power $P_G$. When the normally closed relay 108 receives the control signal $S_{C1}$, the normally closed relay 108 forms an open-circuit, and the power output of the power generator 104 is provided to the control unit 110. For example, the control unit 110 can provide the proper voltage level (control signal $S_{C1}$) to the normally closed relay 108 by using the grid power $P_G$, so that the normally closed relay 108 can stay short-circuited. Also, because the control unit 110 generates the control signal $S_{C1}$ by the grid power $P_G$, the control unit 110 automatically stops providing the control signal $S_{C1}$ to the normally closed relay 108 when the grid power $P_G$ is shutdown.

Next, in step S214, when the normally open relay 114 receives the control signal $S_{C2}$, the normally open relay 114 forms a short-circuit, and the power output of the power generator 104 is provided to the grid power $P_G$ via the control unit 110.

In some embodiments of the invention, the predetermined current value is set according to the specifications or characters. In more detail, a user may obtain the character between the current value $S_I$ and the power output of the power generator 104, and the control unit 110 can use the current value $S_I$ to estimate the power output of the power generator 104 according to the relation. In an embodiment, if the estimated power (corresponding to the current value $S_I$) of that generated by the power generator 104 is greater than the total power consumption of the current-detection unit 106, the normally closed relay 108, the control unit 110, the normally open relay 114 and the wind turbine rotation-speed detection unit 116, it means that the wind-power generator control system 100 can provide a positive power output. Therefore, the control unit 110 can provide the control signal $S_{C1}$ to the normally closed relay 108 for the open-circuit, and provide the control signal $S_{C2}$ to the normally open relay 114 for the short-circuit, such that the power of the power generator 104 can be output to the grid power $P_G$. On the other hand, if the estimated power (corresponding to the current value $S_I$) of that generated by the power generator 104 is less than the total power consumption of the current-detection unit 106, the normally closed relay 108, the control unit 110, the normally open relay 114 and the wind turbine rotation-speed detection unit 116, then the normally closed relay 108 remains short-circuited, and the normally open relay 114 remains open-circuited.

Also, when the wind turbine 102 rotates too fast, the torque of the wind turbine 102 is greater than the torque of the power generator 104, and it may cause the generator system to overload or become damaged. In order to avoid the wind turbine 102 rotating too fast, the control unit 110 also operates according to the rotation speed value $S_R$ in some embodiments. The operation illustrated in FIG. 3 is described in the following paragraphs.

Figure 3:
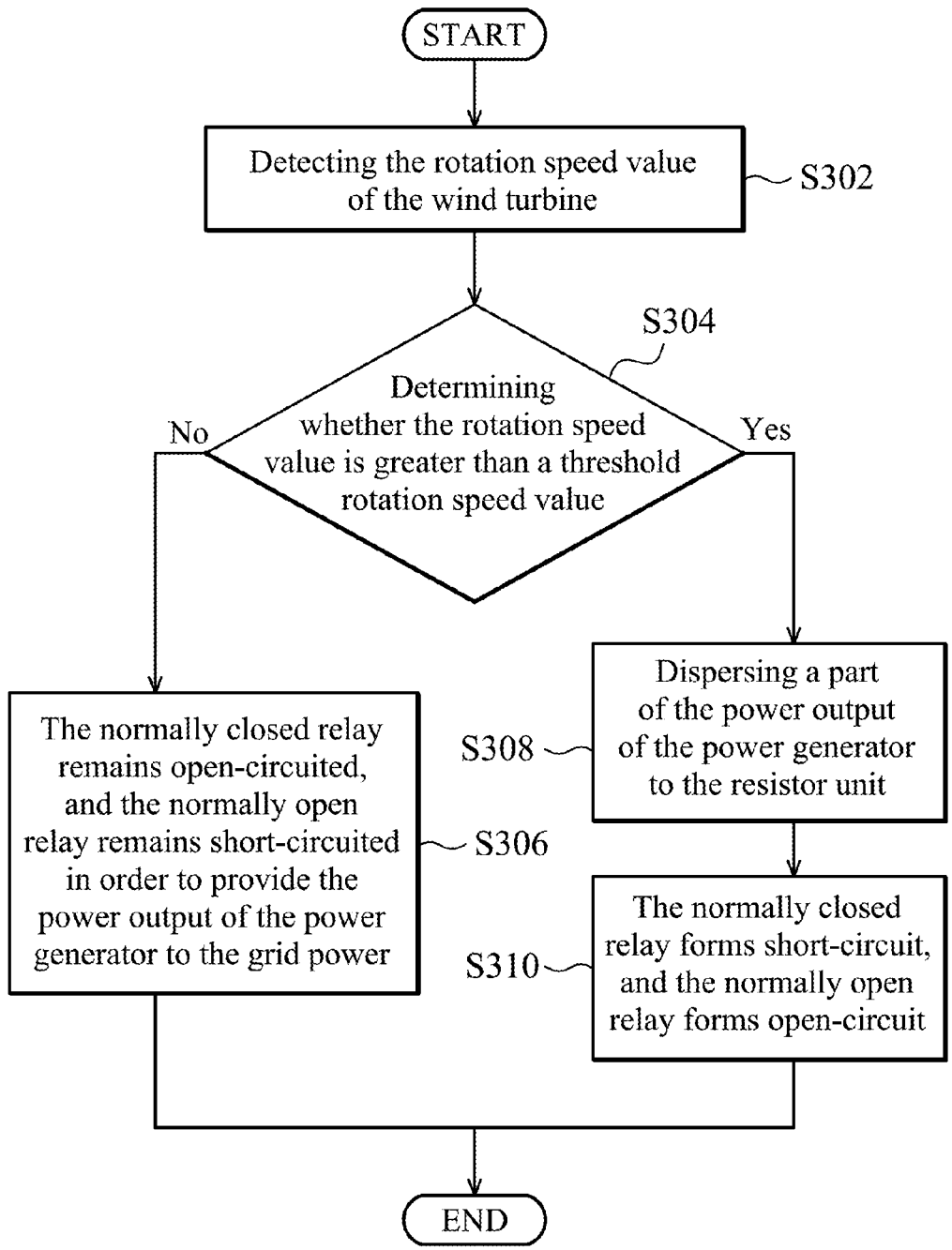
FIG. 3 is a flowchart of an embodiment of a method for the wind-power generator control system shown in FIG. 1.

FIG. 3 is a flowchart of an embodiment of a method for the wind-power generator control system shown in FIG. 1. In step S302, the wind turbine rotation-speed detection unit 116 detects the rotation speed value $S_R$ of the wind turbine 102, and transmits the rotation speed value $S_R$ to the control unit 110. Next, in step S304, the control unit 110 determines whether the rotation speed value $S_R$ is greater than a threshold rotation speed value. When the rotation speed value $S_R$ is less than the threshold rotation speed, step S306 will be performed next. On the other hand, when the rotation speed value $S_R$ is greater than the threshold rotation speed, step S308 will be performed next.

In step S306, the control unit 110 provides a control signal $S_{C1}$ to make the normally closed relay 108 form an open-circuit, and it also provides a control signal $S_{C2}$ to make the normally open relay 114 form a short-circuit. Therefore, the power of the power generator 104 is output to the grid power $P_G$. On the other hand, in step S308, the control unit 110 disperses a part of the power output of the power generator 104 to the resistor unit 112. As part of the power is provided to the resistor unit 112, the rotation speed value $S_R$ of the wind turbine 102 is reduced. Next, in step S310, the control unit 110 stops providing the control signal $S_{C1}$ to the normally closed relay 108, and the normally closed relay 108 forms a short-circuit to protect the power generator 104. Also, the control unit 110 stops providing the control signal $S_{C2}$ to the normally open relay 114, and the normally open relay 114 forms an open-circuit. In some embodiments of step S310, the control unit 110 stops providing the control signal $S_{C1}$ and the control signal $S_{C2}$ to the normally closed relay 108 and the normally open relay 114, when the rotation speed value $S_R$ of the wind turbine 102 decreases to a safe rotation speed. Before the normally closed relay 108 forms a short-circuit, the invention reduces the rotation speed of the wind turbine 102 by splitting the excessive current of the power to the resistor unit 112, so that the damage of the short-circuit to the power generator 104 is reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A wind-power generator control system, comprising:
   a wind turbine;
   a power generator, having a first output terminal and a second output terminal, and outputting a power output via the first output terminal and the second output terminal when the wind turbine rotates;
   a normally closed relay, connected between the first output terminal and the second output terminal;
   a control unit, transmitting a control signal to the normally closed relay by grid power,
   wherein when the normally closed relay does not receive the control signal, the first output terminal short-circuits the second output terminal by the normally closed relay; and
   when the normally closed relay receives the control signal, the first output terminal open-circuits the second output terminal by the normally closed relay; and
   a current-detection unit, detecting the current value of the first output terminal, and transmitting the current value to the control unit, wherein the control unit determines whether to provide the control signal to the normally closed relay according to the current value,
   wherein when the current value is less than a predetermined current value or greater than a rating current value, the control unit stops providing the control signal to the normally closed relay, and wherein when the current value is greater than the predetermined current, the control unit provides the control signal to the normally closed relay.

2. The wind-power generator control system of claim 1, wherein the control unit estimates a power estimate of the power output generated by the power generator according to the current value,
   wherein when the power estimate of the power output is less than the total power consumption of the wind-power generator control system, the control unit stops providing the control signal to the normally closed relay, and
   wherein when the power estimate of the power output is greater than the total power consumption of the wind-power generator control system, the control unit provides the control signal to the normally closed relay.

3. The wind-power generator control system of claim 2, further comprising:
   a switch, coupled between the power generator and the grid power,
   wherein when the power estimate of the power output is greater than the total power consumption of the wind-power generator control system, the control unit turns on the switch; and
   when the power estimate of the power output is less than the total power consumption of the wind-power generator control system, the control unit turns off the switch.

4. The wind-power generator control system of claim 1, wherein the power generator further comprises a rectification unit generating a DC voltage output by the power output.

5. The wind-power generator control system of claim 4, the control unit further comprising an inverter configured to convert the DC voltage output to AC voltage output and provide the AC voltage output to the grid power.

6. The wind-power generator control system of claim 1, wherein when the control unit does not receive the grid power, the control unit stops generating the control signal.

7. A wind-power generator control method for a wind-power generator control system comprising a wind turbine, a power generator, and a normally closed relay, wherein the power generator has a first output terminal and a second output terminal, the normally closed relay is connected between the first output terminal and the second output terminal, and the wind-power generator control method comprises:
   outputting a power output via the first output terminal and the second output terminal when the wind turbine rotates;
   providing a control signal to the normally closed relay by grid power;
   when the normally closed relay does not receive the control signal, short-circuiting the first output terminal and the second output terminal by the normally closed relay;
   when the normally closed relay receives the control signal, open-circuiting the first output terminal and the second output terminal by the normally closed relay;
   detecting the current value of the first output terminal;
   determining whether to provide the control signal to the normally closed relay according to the current value;
   when the current value is less than a predetermined current value or greater than a rating current value, stopping the control signal to the normally closed relay; and
   when the current value is greater than the predetermined current, providing the control signal to the normally closed relay.

8. The wind-power generator control method of claim 7, further comprising:
   estimating a power estimate of the power output generated by the power generator according to the current value;
   when the power estimate of the power output is less than the total power consumption of the wind-power generator control system, stopping the control signal to the normally closed relay; and
   when the power estimate of the power output is greater than the total power consumption of the wind-power generator control system, providing the control signal to the normally closed relay.

9. The wind-power generator control method of claim 8, wherein the wind-power generator control system further comprises a switch coupled between the power generator and the grid power, and the wind-power generator control method further comprises:
   when the power estimate of the power output is greater than the total power consumption of the wind-power generator control system, turning on the switch; and when the power estimate of the power output is less than the total power consumption of the wind-power generator control system, turning off the switch.

10. The wind-power generator control method of claim 7, further comprising:
generating a DC voltage output according to the power output by a rectification unit.

11. The wind-power generator control method of claim 10, further comprising:
converting the DC voltage output to AC voltage output by an inverter; and
providing the AC voltage output to the grid power.

12. The wind-power generator control method of claim 7, further comprising: when the wind-power generator control system does not receive the grid power, stopping the control signal.

13. A wind-power generator control system, comprising:
a wind turbine;
a power generator, having a first output terminal and a second output terminal, and outputting a power output via the first output terminal and the second output terminal when the wind turbine rotates;
a normally closed relay, connected between the first output terminal and the second output terminal;
a control unit, transmitting a control signal to the normally closed relay by grid power,
wherein when the normally closed relay does not receive the control signal, the first output terminal short-circuits the second output terminal by the normally closed relay; and
when the normally closed relay receives the control signal, the first output terminal open-circuits the second output terminal by the normally closed relay;
a resistor unit; and
a wind turbine rotation-speed detection unit, configured to detect the rotation speed of the wind turbine,
wherein when the rotation speed is greater than a threshold rotation speed, the control unit outputs a part of the power output to the resistor unit, wherein after the control outputs the part of the power output to the resistor unit, the control unit stops providing the control signal to the normally closed relay.

14. A wind-power generator control method for a wind-power generator control system comprising a wind turbine, a power generator, and a normally closed relay, wherein the power generator has a first output terminal and a second output terminal, the normally closed relay is connected between the first output terminal and the second output terminal, and the wind-power generator control method comprises:
outputting a power output via the first output terminal and the second output terminal when the wind turbine rotates;
providing a control signal to the normally closed relay by grid power;
when the normally closed relay does not receive the control signal, short-circuiting the first output terminal and the second output terminal by the normally closed relay;
when the normally closed relay receives the control signal, open-circuiting the first output terminal and the second output terminal by the normally closed relay;
detecting the rotation speed of the wind turbine;
when the rotation speed is greater than a threshold rotation speed, outputting a part of the power output to a resistor unit; and
after the control outputs the part of the power output to the resistor unit, stopping the control signal to the normally closed relay.

* * * * *